United States Patent [19]

McCarthy

[11] Patent Number: 5,869,122
[45] Date of Patent: Feb. 9, 1999

[54] TREATMENT OF FRUITS AND VEGETABLES

[75] Inventor: James G. McCarthy, Washington Depot, Conn.

[73] Assignee: Nestec S.A., Vevey, Switzerland

[21] Appl. No.: 707,791

[22] Filed: Sep. 4, 1996

Related U.S. Application Data

[60] Provisional application No. 60/018,262 May 24, 1996.

[51] Int. Cl.$^6$ ....................................................... A23B 7/00
[52] U.S. Cl. ............................ 426/321; 426/49; 426/615; 426/654; 426/518; 426/520
[58] Field of Search .................................... 426/321, 607, 426/49, 50, 51, 330, 330.3, 330.5, 331, 333, 615, 654, 518, 519, 520, 521

[56] References Cited

U.S. PATENT DOCUMENTS

| | | | |
|---|---|---|---|
| 2,531,431 | 11/1950 | Hills | 426/321 |
| 4,504,504 | 3/1985 | Gaehring et al. | 426/321 |
| 5,645,879 | 7/1997 | Bourne | 426/321 |

FOREIGN PATENT DOCUMENTS

| | | | |
|---|---|---|---|
| 2 700 245 A1 | 1/1993 | France | |
| WO 94/12055 | 6/1994 | WIPO | |
| WO 94/25575 | 11/1994 | WIPO | |
| WO 96/11588 | 4/1996 | WIPO | |

OTHER PUBLICATIONS

Senda, A., Patent Abstracts of Japan, abstracting JP 01–124364, May 1989.
Ebe et al., Patent Abstracts of Japan, abstracting JP 03–285651, Dec. 1991.
J. D. Flores et al., "Optimization of a Diced Tomato Calcification Process"; Journal of Food Service—vol. 57, No. 5, 1992.

*Primary Examiner*—Leslie Wong
*Attorney, Agent, or Firm*—Pennie & Edmonds LLP

[57] ABSTRACT

A process for enhancing the consistency of a macerated fruit or vegetable product by macerating a fruit or vegetable material to almost completely disrupt cellular material therein; adding calcium chloride to the fruit or vegetable material in an amount sufficient to increase consistency after subsequent heat treatment of the material; and heat treating the calcium chloride containing fruit or vegetable material for a sufficient time and at a sufficient temperature to inactivate pectin or other carbohydrate polymer degrading enzymes therein to form a macerated fruit or vegetable product with enhanced consistency. For optimum results, the calcium chloride is added to the macerated material within 1 minute after maceration and the heat treating is conducted within 1 minute after the addition of the calcium chloride.

16 Claims, No Drawings

1

TREATMENT OF FRUITS AND VEGETABLES

This application claims priority from U.S. Provisional application Ser. No. 60/018,262, filed May 24, 1996.

FIELD OF THE INVENTION

The present invention relates to the treatment of fruits and vegetables, more particularly to enhance the consistency of macerated fruits and vegetables.

BACKGROUND OF THE INVENTION

FR-A-93/00294, WO94/12055 and WO94/25575 describe a method for increasing the firmness and consistency of fruits or vegetables by the use of pectin methylesterase. FR-A-93/00294 describes the optional addition of from 0.5 to 2.0% of a calcium salt such as calcium carbonate. WO94/12055 describes the optional addition of calcium chloride to fruit or vegetable material which has been treated with pectin methylesterase and which is naturally low in calcium. WO94/25575 states that the firming of fruits and vegetables, and increasing the viscosity or producing gel formation in vegetable or fruit based products, can be accomplished by treating these components with pectin methylesterase and divalent cations, e.g. divalent ions such as calcium.

In "Journal of Food Science-Volume 57, No.5, 1992, pp.1144–1147", the article entitled "Optimization of a Diced Tomato Calcification Process" by John D. Floros et al states that processing of diced tomatoes at a $CaCl_2$ concentration of 0.43% for 3.5 minutes would yield a product with increased firmness. Firmness is critical for diced tomatoes in aseptic processing and packaging, because the diced product is subjected to high shear stress as it is transferred through pumps, pipes, strainers, pressurized tanks and fillers. In diced pieces, the firmness has been attributed to the formation of calcium/pectate cross-links in the middle lamella and cell wall induced by the added calcium ions. These new calcium/pectate cross-links increase the rigidity of the tomato pieces and may also cause a decrease in the activity of the tomato polygalacturonase, thereby inhibiting the degradation of pectin in the middle lamella, cell wall and pericarp tissue in general by endogenous hydrolases such as polygalacturonase. During the $CaCl_2$ treatment, the enzyme pectin methylesterase is believed to remain active, creating additional calcium/pectin cross-links and thus generating further rigidity in the tomato pieces.

It should be noted that in diced tomato pieces, the cellular material is only slightly disrupted whereas in macerated tomatoes used, for instance, for preparing a tomato paste, the cellular material is almost completely disrupted. In the normal industrial process for the manufacture of tomato paste, the tomato tissue is macerated and then immediately heat-treated to above about 82° C. to inactivate the pectin degrading enzymes naturally present in the tomato. In the absence of this enzyme inactivation step, significant breakdown of the pectic and other carbohydrate polymers will result in a product of low consistency (see U.S. Pat. No. 4,547,375). This heat treatment to inactivate the pectin degrading enzymes naturally present in the tomato is known as the "hot-break" in the tomato industry. It is widely held in the tomato industry that the pectin degrading enzymes (pectin methylesterase, polygalacturonase, pectin lyase) and other cell wall carbohydrases such as the enzyme exo-(1-4) beta-D galactanase (WO95/232228) and the endobeta (1-4) glucanases (Lashbrook, et al. (1994) The Plant Cell 6, (1485–1493) will degrade the carbohydrate polymers responsible for high consistency if they are not immediately inactivated by heat. Therefore it is assumed that, to obtain tomato paste having a high consistency, the enzymes in the macerated tomatoes should be inactivated by heat as soon as possible by the "hot-break" method (see W.Gould "Tomato Production, Processing & Technology, $3^{rd}$ Edition (1991) CTI Publications Inc).

SUMMARY OF THE INVENTION

Surprisingly I have found that, contrary to the above widely held asumptions, by postponing the heat inactivation step and adding calcium chloride to the tomatoes before, during or after maceration under certain specific defined conditions there is a significant increase in the final consistency of the paste produced when compared to a paste made without calcium chloride addition.

According to the present invention there is provided a process for enhancing the consistency of a macerated fruit or vegetable product which comprises a) macerating the fruit or vegetable material,
b) treating the fruit or vegetable material before, during or after maceration with calcium chloride, and
c) heating the macerated fruit or vegetable material treated with the calcium chloride to inactivate the pectin and other carbohydrate polymer degrading enzymes present in the macerated material.

DETAILED DESCRIPTION OF THE INVENTION

The fruit or vegetable may be, for instance, apples, pears, strawberries or tomatoes, etc.

The maceration of the fruit or vegetable may be carried out by conventional methods such as chopping, slicing, grinding, crushing or homogenising, etc.

The treated macerated fruit or vegetable material may be used in the preparation of jams, jellies, compotes, pulps, sauces, soups, pastes, purees or ketchup, etc.

The calcium chloride used to treat the macerated fruit or vegetable material may conveniently be added in a liquid medium, for example, either as a solution in water or in a fruit or vegetable juice. When the calcium chloride is added before maceration, it may be added directly to the whole fruit or vegetable or to pieces of the fruit or vegetable, e.g. in diced form, preferably just prior to the maceration step, preferably less than 5 minutes and especially less than 1 minute prior to the maceration step. When the calcium chloride is added after maceration, it should be added as soon as possible after the maceration, for example, within 1 minute, preferably within 30 seconds, more preferably within 15 seconds and especially within 5 seconds of the maceration of the fruit or vegetable material. The final level of added calcium chloride (measured as added calcium) may be, for example, from 0.0005 to 1%, preferably from 0.001 to 0.5% and especially from 0.005 to 0.08% by weight based on the weight of the liquid medium.

The temperature of the treatment with the calcium chloride may be from 10° to 55° C., preferably from 20° to 45° C. and especially from 25° to 40° C.

The duration of the treatment with the calcium chloride may conveniently be up to 15 minutes, preferably from 30 seconds to 12 minutes, and more preferably from 5 to 10 minutes. Periods longer than 15 minutes may be used but are less commercially feasible.

After treating with calcium chloride, the macerated fruit or vegetable material treated with the calcium chloride is heated to inactivate the pectin and other carbohydrate polymer degrading enzymes present in the macerated material, preferably to a temperature above 50° C., more preferably above 82° C., for example from 90° to 100° C. The heat treatment should take place as soon as possible after the treatment with calcium chloride, e.g within 1 minute and preferably within 30 seconds. The duration of the heat treatment is conveniently from 5 to 20 minutes and preferably from 10 to 15 minutes.

Although the process of the present invention may be carried out batchwise, a continuous process is preferred. In the continuous processing of tomatoes, the normal tomato processing line may be employed except that an extra holding tube or tank is inserted between the maceration step and the heat-treatment (hot-break) step.

In addition to increasing the consistency, the addition of calcium chloride (especially at the higher levels mentioned) can also increase the nutritional value of macerated tomato products for the consumer, e.g. the addition of calcium chloride could increase the amount of Ca++ in one serving of puree up to 0.5–4 fold.

EXAMPLES

The following Examples further illustrate the present invention.

Example 1

Commercial processing tomatoes (variety Heinz 8892) were macerated directly into a stirred 25 gallon tank at a rate of 10 kg/minute. Simultaneously, a solution of 38% $CaCl_2$ was added into the tank to give a final $Ca^{++}$ concentration of 0.005%. The holding time for the tomato macerate/$CaCl_2$ mixture in the tank, which had a temperature of between 23°–33° C., was approximately 5 minutes. The tomato/$CaCl_2$ mixture was then directly introduced into the hot break (approximately 95° C.) to inactivate the pectin degrading enzymes and the other endogeneous tomato polysaccharide degrading enzymes. The hot break residence time of the macerate/$CaCl_2$ was approximately 10 minutes. The resulting hot break tomato juice was then run through a pulper finisher equiped with a 2.3 mm screen and then evaporated to 12–28% brix paste using a Rossi-Catelli pilot scale vacuum evaporator (model T-05) to produce paste. The tomato paste was then hot filled into cans at 93° C. and the cans were seamed. These sealed cans were then heat treated at 93° C. for six minutes, and then cooled to 38° C. (approximately one hour). Subsequently, the paste samples were analysed for bostwick consistency and blotter values. The blotter is a measure of the water holding capacity. The bostwick consistency was measured by first diluting the paste samples at room temperature (25° C.) with water to give a final brix value of 12. This reconstituted tomato sample was then used to over-fill the chamber of a previously leveled metal botwick consistometer. The surface of the tomato product in the chamber was fixed by scraping off any material above the metal walls using a spatula. A single determination is started by releasing the trap, and the migration of the tomato product is measured in cm. after 30 seconds. A lower Bostwick value indicates a better consistency of the product. The blotter value is measured by evenly spreading two grams of the diluted 12 brix product in a circle of 2.7 cm diameter printed on Whatman filter paper (#3, quantitative circles, 90 mm). Water was then allowed to diffuse from the tomato product into the paper for 30 minutes at room temperature. The distance of the water migration from the edge of the circle is measured using the millimeter scales stamped on the paper at 90° angles. The value recorded is an average of the measurements in the four directions.

The results are shown in Table 1.

TABLE 1

|  | BOSTWICK (at 12 Brix) | Blotter Values (at 12 Brix) |
| --- | --- | --- |
| CONTROL (15.1 Brix) | 2.87 | 1 mm |
| $CaCl_2$ TREATED (14,8 Brix) | 1.48 | 0 mm |

It is clear that there is a striking reduction of bostwick value at 12 Brix for the $CaCl_2$ treated sample relative to the control. The blotter value of the treated sample was also improved versus the control.

Example 2

This example demonstrates that adding a higher level of $CaCl_2$ to the fresh macerate can also. produce an increase in the Bostwick consistency of the final paste. The procedure was the same as described in Example 1 except that a mixture of two different commercial processing varieties were used (Nema 512 and Heinz 8892), and the final concentration of $Ca^{++}$ in the fresh tomato macerate was raised to 0.02%. The results are shown in Table 2.

TABLE 2

|  | BOSTWICK (at 12 Brix) | Blotter Values (at 12 Brix) |
| --- | --- | --- |
| CONTROL (12.4 Brix) | 1.05 | 8 mm |
| $CaCl_2$ TREATED (14.3 Brix) | 0.7 | 10.13 mm |

In this example, the control sample had a very low bostwick due to a combination of raw material with an unusually low bostwick consistency value and the fact that there was a lot of damaged fruit in the sample used (high juice loss). Nonetheless, the treated sample still clearly exhibited a reduction in the botswick consistency. The blotter value of the treated paste was slightly worse (had higher water loss) than the control. The results of this experiment indicate that addition of 0.02% $Ca^{++}$ is also effective at lowering the bostwick value for the final paste. In this experiment, the addition of a higher level of $CaCl_2$ caused a slight increase in the blotter value.

Example 3

In order to ensure that the bostwick increase produced by adding $CaCl_2$ before the hot break is stable throughout the concentration process, another example was carried out in which more concentrated paste samples were made. The experimental protocol is similar to that used in Example 1 except that the paste samples were concentrated further in the evaporator. The commercial variety used in this example was again Heinz 8892. The results are presented in Table 3.

TABLE 3

|  | BOSTWICK (at 12 Brix) | Blotter Values (at 12 Brix) |
|---|---|---|
| CONTROL (14.5 Brix) | 1.47 | 8.7 mm |
| CaCl$_2$ TREATED (13.9 Brix) | 0.73 | 8.6 mm |
| CONTROL (26.9 Brix) | 2.73 | 9.4 mm |
| CaCl$_2$ TREATED (19.4 Brix) | 1.16 | 9.4 mm |

The results presented in Table 3 again clearly demonstrate that addition of Ca$^{++}$ to the fresh macerate (giving a final concentration of 0.005% Ca$^{++}$) increases the bostwick consistency of 13.9 Brix tomato paste relative to the untreated control at a similar brix level. After the control and treated pastes were concentrated further, they both lost some bostwick consistency due to heat and shear induced damage to the tomato polysaccharides. Nonetheless, the difference in consistency between the two samples remained. However, the true bostwick difference may be slightly less than the 1.57 cm difference seen between the Control (26.9 Brix) and the treated sample (19.4 Brix) if the final paste brix values had been closer. The rather large difference between the Brix values of the Control and CaCl$_2$ treated samples was due to the fact that when the CaCl$_2$ treated paste was concentrated beyond 13.9 Brix, it became increasingly difficult to concentrate due to the increased consistency and water holding of the treated paste. At 19.4 brix, the evaporator was incapable of concentrating the material further without a blockage. The fact that this problem was not encountered with the control sample, is further proof of the significant consistency differences between the samples. Finally, in this experiment, the CaCl$_2$ treatment did not dramatically affect the blotter value of the CaCl$_2$ treated sample versus the control. This example demonstrates that the increase in consistency produced by CaCl$_2$ addition is not lost during the evaporation process.

Example 4

This example demonstrates that the addition of CaCl$_2$ before a "cold break" enzyme inactivation step also results in an increase in bostwick consistency of the paste produced versus an untreated control sample. The procedure used was identical to that described in Example 1 except that the enzyme inactivation step was carried out at approximately 72° C. rather than approximately 95° C. The commercial processing tomato variety used in this experiment was Orsetti 3155. The results are presented in Table 4.

TABLE 4

|  | BOSTWICK (at 12 Brix) | Blotter Values (at 12 Brix) |
|---|---|---|
| CONTROL (15 Brix) | 5.4 | >25 mm |
| CaCl$_2$ TREATED (14.5 Brix) | 4.19 | 15.25 mm |

The results in Table 4 demonstrate that addition of CaCl$_2$ to the fresh macerate before a cold break enzyme inactivation step also results in a better Bostwick consistency versus an untreated control. Under these processing conditions, and with this variety, the addition of CaCl$_2$ also had the advantage of producing a significant reduction in the blotter value.

In conclusion, the fact that addition of CaCl$_2$ before either a "hot" or "cold" break enzyme inactivation step causes increases in the bostwick value for different varieties of processing tomato shows the general applicability of this bostwick improvement method.

I claim:

1. A process for enhancing the consistency of a macerated fruit or vegetable product which comprises
   a) macerating the fruit or vegetable material,
   b) treating the fruit or vegetable material before, during or after maceration with calcium chloride, and
   c) heating the macerated fruit or vegetable material treated with the calcium chloride to inactivate the pectin and other carbohydrate polymer degrading enzymes present in the macerated material;
   wherein the heating step is conducted on the calcium chloride containing macerated fruit or vegetable material within 1 minute after treating with calcium chloride or within 1 minute after maceration, whichever is later.

2. A process according to claim 1 wherein the fruit or vegetable is selected from the group consisting of apples, pears, strawberries or tomatoes.

3. A process according to claim 1 wherein the treated macerated fruit or vegetable material is used in the preparation of jams, jellies, compotes, sauces, soups, pulps, pastes, purees or ketchup.

4. A process according to claim 1 wherein the calcium chloride used to treat the macerated fruit or vegetable material is added in a liquid medium.

5. A process according to claim 1 wherein the calcium chloride is added within 1 minute of the maceration of the fruit or vegetable material.

6. A process according to claim 4 wherein the concentration of the calcium chloride is from 0.0005 to 1% by weight based on the weight of the liquid medium.

7. A process according to claim 1 wherein the temperature of the treatment with the calcium chloride is from 10° to 55° C.

8. A process according to claim 1 wherein the duration of the treatment with the calcium chloride is from 30 seconds to 12 minutes.

9. A process according to claim 1 wherein after treating with calcium chloride, the fruit or vegetable material treated with the calcium chloride is heated to a temperature above 50° C. to inactivate the pectin and other carbohydrate polymer degrading enzymes present in the macerated material.

10. A process according to claim 1 wherein the heat treatment takes place within 1 minute after treating with calcium chloride.

11. A process according to claim 1 wherein the duration of the heat treatment is from 5 to 20 minutes.

12. A process for enhancing the consistency of a macerated fruit or vegetable product which comprises:
   macerating a fruit or vegetable material to almost completely disrupt cellular material therein;
   adding calcium chloride to the fruit or vegetable material in an amount sufficient to increase consistency after subsequent heat treatment of the material; and
   heat treating the calcium chloride containing fruit or vegetable material for a sufficient time and at a sufficient temperature to inactivate pectin or other carbohydrate polymer degrading enzymes therein to form a macerated fruit or vegetable product having enhanced consistency;
   wherein the calcium chloride is added to the fruit or vegetable material prior to maceration, during maceration or within 1 minute after maceration and the heat treating is conducted on the calcium chloride containing macerated fruit or vegetable material within 1 minute after the addition of calcium chloride or within 1 minute after maceration, whichever is later.

13. The process of claim 12 wherein the calcium chloride is added to the macerated material within 1 minute after maceration and the heat treating is conducted within 1 minute after the addition of the calcium chloride.

14. The process of claim 13 wherein the fruit or vegetable material is not heated prior to maceration.

15. A process for enhancing the consistency of a macerated fruit or vegetable product which comprises:

macerating unheated fruit or vegetable material to almost completely disrupt all cellular material therein;

adding a solution of calcium chloride to treat the fruit or vegetable material before, during or no later than 1 minute after maceration, the calcium chloride being added in an amount sufficient to treat the fruit or vegetable material to increase the consistency of the material after a subsequent heat treatment; and heat treating the calcium chloride containing macerated fruit or vegetable material no later than 1 minute after the later of maceration or the addition of calcium chloride solution for about 5 to 20 minutes at a temperature of about 82° to 100° C. to inactivate pectin or other carbohydrate polymer degrading enzymes therein to form a fruit or vegetable product having increased consistency.

16. The process of claim 15 wherein the calcium chloride is present in the solution at a concentration of 0.0005 to 1% by weight, the temperature of the solution is 10° to 55° C., the duration of the calcium chloride treatment is 30 seconds to 12 minutes and the fruit or vegetable material is selected from the group consisting of apples, pears, strawberries or tomatoes.

* * * * *